April 21, 1936.  T. H. WHISLER ET AL  2,037,870
DEVICE FOR CLEANING AND WASHING CONTAINERS
Filed Jan. 14, 1935
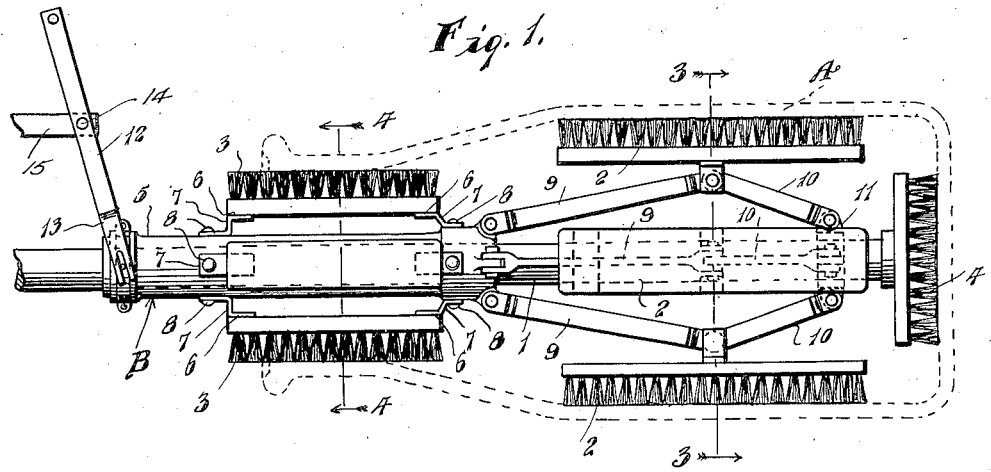
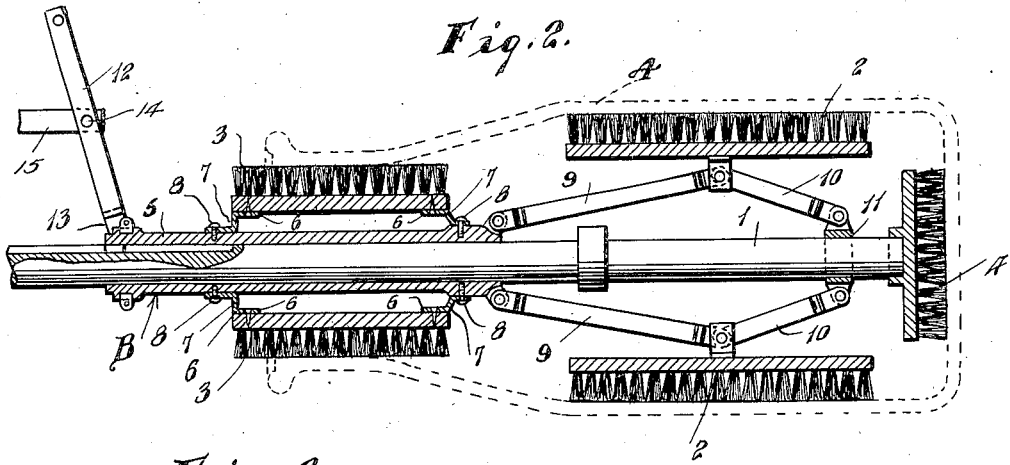
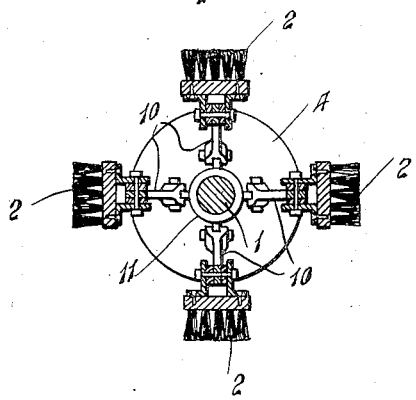
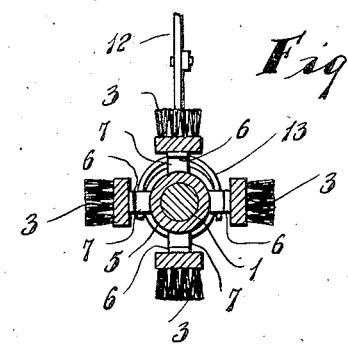
Inventors
T. H. Whisler, E. H. Robinson Patented Apr. 21, 1936

2,037,870

UNITED STATES PATENT OFFICE 2,037,870

DEVICE FOR CLEANING AND WASHING CONTAINERS

Thomas H. Whisler and Edgar H. Robinson, Leipsic, Ohio

Application January 14, 1935, Serial No. 1,760

1 Claim. (Cl. 15—65)

This invention relates to new and useful improvements in devices for cleaning and washing containers.

One object of our invention is to provide a device of the character specified, especially designed for cleaning and washing containers having a neck or opening of smaller diameter than that of the body of the container, such as milk cans, milk bottles, fruit jars and the like.

A further object of the invention is to provide a device of this kind adapted to clean the body, neck and bottom of the container at the same time.

A still further object of our invention is to provide a device for cleaning and washing containers, which is simple and economical in construction and highly efficient and durable in use.

With the foregoing and other objects in view that will appear as the nature of our invention is better understood, the same consists in the novel features of construction, combination and arrangement of parts illustrated in the accompanying drawing and more particularly pointed out in the appended claim.

In the accompanying drawing, which is for illustrative purposes only and therefore not drawn to scale:

Figure 1 is a side elevation, illustrating the application of our invention in cleaning and washing the inside of a milk bottle.

Figure 2 is a similar view, with parts shown in section.

Figure 3 is a vertical transverse section, taken on line 3—3 of Figure 1 and Figure 4 is a vertical transverse section, taken on line 4—4 of Figure 1.

Referring to the drawing for a more particular description of our invention, and in which drawing like parts are designated by like reference characters throughout the several views, A designates a milk bottle or similar container having a neck of smaller diameter than that of the body of the container and B, the cleaning and washing device, as a whole.

Specifically, the cleaning and washing device comprises a horizontal revolving shaft 1, equipped with two series of longer and shorter brushes 2 and 3, respectively, for cleaning the body and neck of the container. A single brush 4 is also carried by the outer end of shaft 1 for the purpose of cleaning the bottom of the container. Each series of brushes 2 and 3 preferably consists of four individual units, spaced equi-distances apart around the circumference of the shaft, but it is apparent that this number may be increased or decreased, as desired, to meet the requirements of any particular case. The brushes 3 are carried by the sleeve 5, slidably keyed to the shaft 1 and are suitably fastened at opposite ends, to the horizontal inwardly extending offset portions 6 of the metal brackets 7, removably connected at their outer ends to the outer surface of the sleeve by means of fastening screws 8 or other equivalent means. The brushes 2 are connected at their centers by means of the longer and shorter longitudinally disposed inclined links 9 and 10, respectively, with the outer end of the sliding sleeve 5 and the stationary spider 11, fixed to the outer end of the revolving shaft 1.

A lever 12 is connected at its lower end to the inner end of the sleeve 5, by means of the shifting fork 13, and in practice, the sleeve may be slid inwardly on the shaft 1 by the operator, through the medium of this lever, to contract the brushes 2 to a sufficient extent to permit introduction or passage through the neck of the container, preparatory to the cleaning and washing operation. After the brushes are inserted in the container, the sleeve 5 is moved in the opposite direction to cause the former to engage the inner surface of the body of the milk bottle or other container and the brushes 3 the inner surface of the neck of the container. The brushes 2 and 3 may be held in normal or operative position at the desired pressure by the lever 12. The lever 12 is fulcrumed, as at 14, to the bar or support 15. The shaft 1 is revolved by suitable power (not shown) which will cause the brushes 2, 3, and 4 to revolve with the shaft and simultaneously clean the body, neck and bottom, respectively, of the container. The container may be placed in position for cleaning or removed while the device is in motion. In cleaning the outside of the container, the brushes 3 will also act as balancer or equalizer.

From the foregoing description taken in connection with the drawing, it is thought that the construction, operation and advantages of our invention will be readily understood, without requiring a more extended explanation.

Having described our invention, what we claim as new and desire to secure by Letters Patent, is:

In a device for cleaning and washing containers having a neck of smaller diameter than that of the body of the container, a revolving shaft, two series of outer and inner brushes for simultaneously cleaning the body and neck, respectively, of the container, a sleeve slidably keyed to the inner end of the revolving shaft, a spider fixed to the outer or opposite end of said shaft, metal brackets for securing opposite ends of the inner brushes to the sleeve, longitudinally disposed longer and shorter inclined links for connecting the outer brushes at their respective centers with the spider and outer end of the sleeve and a lever for shifting the sleeve in either direction on the shaft, substantially as and for the purpose specified.

THOMAS H. WHISLER.
EDGAR H. ROBINSON.